T. J. QUIRK.
FEED WATER REGULATOR.
APPLICATION FILED AUG. 20, 1909.
969,078. Patented Aug. 30, 1910.
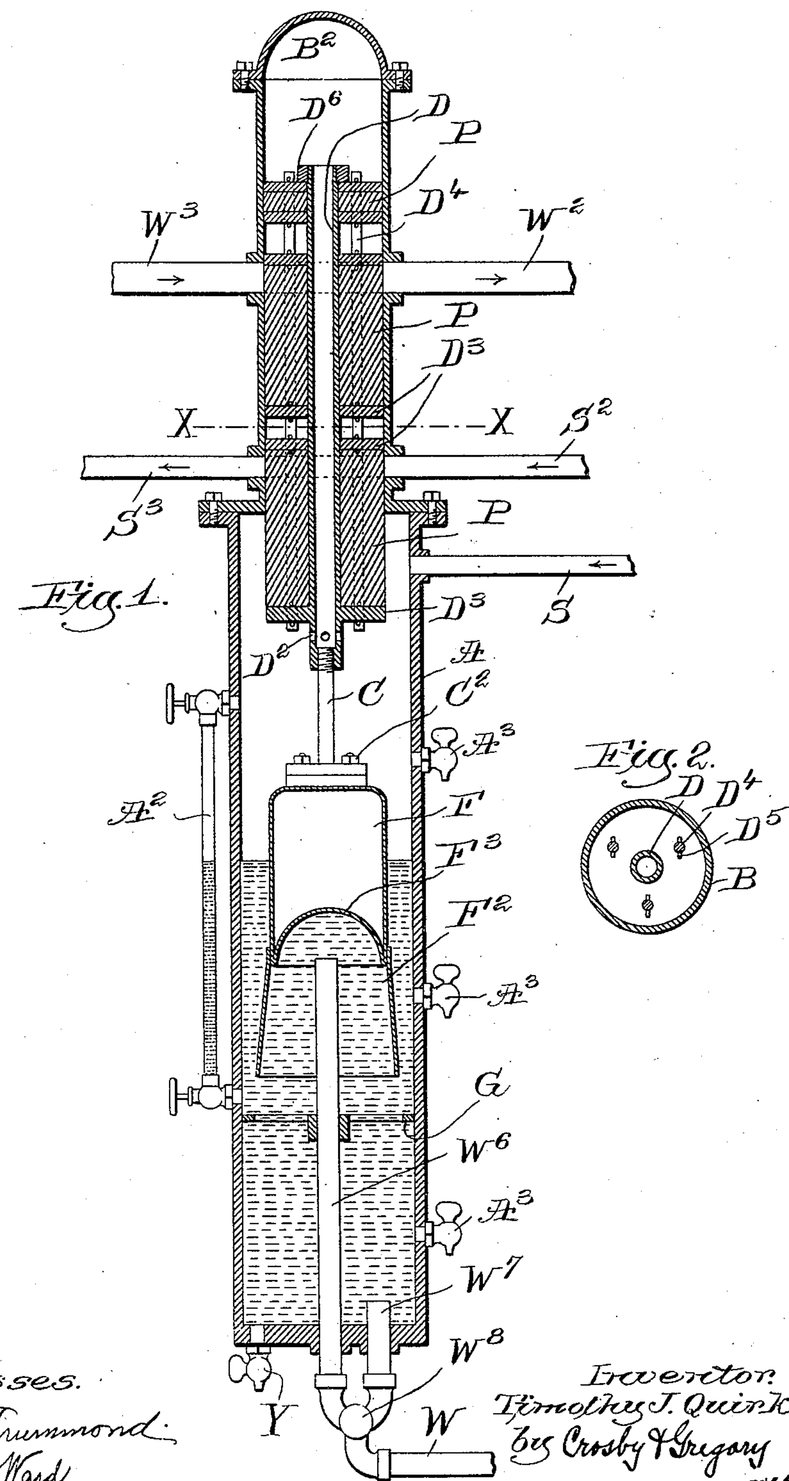
Witnesses.
Thomas J. Drummond
Joseph M. Ward
Inventor.
Timothy J. Quirk,
by Crosby & Gregory
attys.

UNITED STATES PATENT OFFICE.

TIMOTHY J. QUIRK, OF SOUTH BOSTON, MASSACHUSETTS.

FEED-WATER REGULATOR.

969,078. Specification of Letters Patent. Patented Aug. 30, 1910.

Application filed August 20, 1909. Serial No. 513,737.

*To all whom it may concern:*

Be it known that I, TIMOTHY J. QUIRK, a citizen of the United States, residing at South Boston, county of Suffolk, and State of Massachusetts, have invented an Improvement in Feed-Water Regulators, of which the following description, in connection with the accompanying drawing, is a specification, like characters on the drawing representing like parts.

This invention relates to a feed water regulator, or device for automatically regulating the supply of water to a steam boiler.

The object of the invention is to provide a device of this character which shall be efficient and sure in its action, and the main feature of the invention resides in the means for actuating the valves by which the pump is set in operation so as to insure the actuation of these valves by the variation of the level of the water.

The invention will more fully appear from the accompanying description and drawings, and will be particularly pointed out in the claims.

The drawings represent a form of construction embodying the invention, only the ends of the pipes connecting with the pump, boiler, etc., being illustrated.

In the drawings, Figure 1 is a central, longitudinal, vertical cross-sectional view of a preferred form of apparatus embodying the invention. Fig. 2 is a horizontal, cross-sectional view taken on the line $x$—$x$, Fig. 1.

The casing of the device is preferably formed in two main sections, a lower section A comprising the usual float chamber, and an upper section B in which the valve portions of the apparatus are located.

The lower section A is preferably of cylindrical form and is connected at its upper end by a steam pipe S running to the steam space of the boiler, and with its lower end by a water pipe W running to the water space of the boiler. This latter pipe preferably enters the chamber at its bottom which is provided with a drainage cock Y by which the float chamber may be drained off. The connections to the steam and water spaces of the boiler, consequently, insure the maintenance of water in the float chamber at the same level as in the boiler. An ordinary form of water glass $A^2$ is connected to the float chamber at one side, and a series of gage cocks is arranged at various vertical heights on the other side.

The upper, or valve, section B of the casing has near its lower end a pair of ports to which the steam pipe $S^2$, coming from the boiler, and the steam pipe $S^3$, going to the pump, are respectively connected, and it has near its upper end another pair of ports to which the water pipe $W^3$, coming from the pump, and the water pipe $W^2$, going to the boiler, are respectively connected. These ports are arranged to be opened and closed at the proper time by valves operated by a float whose position is determined by the water level in the float chamber. The valves may be constructed in various ways, but as a preferred form and specifically considered as a feature of the invention, the construction illustrated is preferred. The stem C extending upward from the float is connected to a tube D communicating by means of the apertures $D^2$ at its lower end with the float chamber, and by means of its open upper end with the chamber $B^2$ in the upper end of the upper section of the casing, so that pressure is equalized above and below the valve mechanism. This tube is surrounded by steam packing except at two places, where spaces are left, which, when brought into alinement with the steam and water tubes, respectively, serve to connect the steam pipes and the water pipes, respectively. A simple form of construction is shown and comprises a series of disks $D^3$ surrounding the tube and held properly separated by vertical rods $D^4$ and cross pins $D^5$. The lower disk $D^3$ may be made fast to or integral with the tube, while the other may move vertically upon it, and a nut $D^6$ threaded upon the upper end of the tube will serve to adjust the disks. Between the disks, except where spaces are to be left to serve as connections between the pipes, steam packing P of suitable character is provided.

The float chamber is preferably formed of thin metal with an air-tight space therein and connected in any suitable manner to the stem C, as by bolts $C^a$. The float also has as an essential feature of the invention an extension $F^2$ at its lower end, forming a large chamber open at the bottom, and this chamber may be increased in size by forming the bottom $F^3$ of the air-tight portion of the float reëntrant, as illustrated.

The operation of the device will be apparent. The water from the boiler fills the lower end of the float chamber, and the steam the upper end. The chamber at the bottom of the float is filled with water. In normal position the parts will be about as illustrated with the valve between the water and steam pipes leading from the boiler to the pump closed. If the water level rises in the boiler, the float will rise and the connected valve apparatus with it, still maintaining the water and steam pipes leading water level in the boiler falls, the float moves from the boiler to the pump closed. If the downwardly, carrying with it the valves, and when the water reaches a level where water must be admitted to the boiler, the spaces between the disks $D^3$ come into alinement with the steam and water pipes leading from the pump to the boiler, and steam passing to the pump sets it into operation, and water is returned by the pump to the boiler, thus raising the level.

It is obvious that it is essential that when the water level falls more water must be admitted to the boiler, and that the downward movement of the valves must be insured; otherwise, steam would not be generated and injury, if not destruction, to the boiler might be occasioned. The friction between the valves and casing must be overcome, and this is done in the present invention by the float provided with a chamber at its lower end, for as the level of the water falls in the float chamber below the top of the open chamber in the float, then the water therein adds its weight to the float and this weight increases as the level of the water in the float chamber falls, thus bringing to bear a greater and greater weight upon the valve mechanism and insuring its operation.

A grid G is placed in the float chamber at a suitable point to limit the downward movement of the float. It is possible for the water level to fall below the bottom edge of the float and thus draw water out from the open chamber at the bottom of the float, but this would rarely occur. To provide for filling this chamber at the bottom of the float the water pipe W is extended upwardly at $W^6$ so that when the float rests upon the grid G the pipe $W^6$ will come nearly into contact with the top $F^3$ of the chamber at the bottom of the float. The normal opening from the pipe W into the float chamber is at $W^7$, and a valve is provided, operated by an exterior handle $W^8$, so that the upper section $W^6$ of the water pipe, or the lower section $W^7$, may be connected as required with the main pipe W. Under normal conditions, the section $W^7$ will be open, but when it is desired to fill the chamber at the bottom of the float, this section would be closed and the section $W^6$ open. The downward pull upon the float occasioned by the weight of water therein when the water level falls below the top of the chamber in the bottom of the float steadily increases and becomes very powerful, so that it is practically impossible for the valves to stick and prevent the supply of water to the boiler.

Having fully described my invention what I claim as new and desire to secure by Letters Patent is:

1. A feed water regulator comprising, a casing containing a vertical float chamber, pipes connecting respectively the upper and lower ends of said chamber with the steam and water spaces of the boiler, water and steam pipes extending from the pump to the boiler, and valves therein, a float provided at its lower end with a chamber open at the bottom, operative connections between the float and the valves and means for filling said open chamber with water while in position in the float chamber.

2. A feed water regulator comprising, a casing containing a vertical float chamber, pipes connecting respectively the upper and lower ends of said chamber with the steam and water spaces of the boiler, water and steam pipes extending from the pump to the boiler, and valves therein, a float provided at its lower end with a chamber open at the bottom, operative connections between the float and the valves, an extension from the first-named water pipe, terminating at a point just beneath the top of the said chamber in the float when the float is in its lowermost position.

3. A feed water regulator comprising, a casing having a lower section and an upper section, the said lower section forming a float chamber, pipes connecting respectively the upper and lower ends of said chamber with the steam and water spaces of the boiler, two pairs of ports in the upper section of the casing, one pair connected by the water pipes and the other pair by the steam pipes to the pump and boiler, a vertically sliding member fitting said upper section and provided with a pair of spaces adapted to aline with and connect the said pairs of ports respectively, a float provided at its lower end with a chamber open at the bottom, connections between said float and said sliding member whereby the movement of the former is transmitted to the latter to open and close the said ports and means for filling said open chamber with water while in position in the float chamber.

4. A feed water regulator comprising, a casing containing a float chamber, a float in said chamber provided at its lower end with a chamber open at the bottom and means for filling said open chamber with water while in position in the float chamber.

5. A feed water regulator comprising a casing containing a float chamber, a float in said chamber provided at its lower end with a chamber open at the bottom, a water pipe entering the float chamber below the lower limit of movement of the lower edge of the float and a second water pipe entering the float chamber and extending up within said open chamber to the top thereof when at its lower limit of movement.

In testimony whereof, I have signed my name to this specification, in the presence of two subscribing witnesses.

TIMOTHY J. QUIRK.

Witnesses:
NATHAN HEARD,
FREDERICK S. GREENLEAF.